United States Patent
Malayath et al.

(10) Patent No.: US 8,711,926 B2
(45) Date of Patent: Apr. 29, 2014

(54) DISTORTION ESTIMATION FOR QUANTIZED DATA

(75) Inventors: Narendranath Malayath, San Diego, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1576 days.

(21) Appl. No.: 11/672,550

(22) Filed: Feb. 8, 2007

(65) Prior Publication Data

US 2008/0192821 A1    Aug. 14, 2008

(51) Int. Cl.
*H04N 11/02* (2006.01)

(52) U.S. Cl.
USPC .................................................. 375/240.03

(58) Field of Classification Search
USPC .................................................... 375/240.03
See application file for complete search history.

(56) References Cited

U.S. PATENT DOCUMENTS

| | | | |
|---|---|---|---|
| 5,751,846 A | 5/1998 | Higgins-Luthman et al. | |
| 6,067,118 A * | 5/2000 | Chen et al. | 375/240.03 |
| 6,408,026 B1 | 6/2002 | Tao | |
| 6,414,992 B1 * | 7/2002 | Sriram et al. | 375/240.13 |
| 6,539,124 B2 * | 3/2003 | Sethuraman et al. | 382/251 |
| 7,082,167 B2 * | 7/2006 | Alexandre et al. | 375/240.26 |
| 7,099,513 B2 * | 8/2006 | Cullen et al. | 382/239 |
| 7,161,982 B2 * | 1/2007 | Kimoto | 375/240.13 |
| 7,330,509 B2 * | 2/2008 | Lu et al. | 375/240.03 |
| 7,418,147 B2 * | 8/2008 | Kamaci et al. | 382/251 |
| 7,705,881 B2 * | 4/2010 | Okamoto et al. | 348/180 |
| 7,876,819 B2 * | 1/2011 | Wang et al. | 375/240.03 |
| 8,050,452 B2 * | 11/2011 | Bradley et al. | 382/100 |
| 8,059,721 B2 * | 11/2011 | Chang et al. | 375/240.18 |
| 8,126,283 B1 * | 2/2012 | Garbacea et al. | 382/243 |

(Continued)

FOREIGN PATENT DOCUMENTS

| | | |
|---|---|---|
| EP | 0509576 | 10/1992 |
| EP | 1510970 | 3/2005 |

(Continued)

OTHER PUBLICATIONS

ITU-T Telecommunication Standardization Sector of ITU: H.264 Series H: Audiovisual and Multimedia Systems. Infrastructure of audiovisual services—Coding of moving video—Advanced video coding for generic audiovisual services—Mar. 2005, pp. 1-324.

(Continued)

*Primary Examiner* — Zachary A Davis
(74) *Attorney, Agent, or Firm* — Brent Boyd

(57) ABSTRACT

Techniques for estimating distortion due to quantization of data are described. A histogram with multiple bins may be obtained for a set of coefficients to be quantized. Distortion due to quantization of the set of coefficients may be estimated based on the histogram and average distortions for the histogram bins. The number of coefficients in each bin may be multiplied with an average distortion for the bin to obtain a per-bin distortion. The per-bin distortions for all of the bins may be accumulated and scaled with a correction factor to obtain the estimated distortion. The techniques may be used to estimate distortions for a set of coding elements. Distortion and rate may be estimated for each coding element for each of multiple quantization steps. A set of quantization steps may be selected for the set of coding elements based on the estimated distortions and the estimated rates for the set of coding elements for different quantization steps.

25 Claims, 7 Drawing Sheets

(56) References Cited

U.S. PATENT DOCUMENTS

| | | | |
|---|---|---|---|
| 8,135,063 B2 * | 3/2012 | Kwon et al. | 375/240.03 |
| 8,155,195 B2 * | 4/2012 | Regunathan et al. | 375/240.16 |
| 2007/0110153 A1 * | 5/2007 | Cho et al. | 375/240.12 |
| 2007/0237232 A1 * | 10/2007 | Chang et al. | 375/240.16 |

FOREIGN PATENT DOCUMENTS

| | | |
|---|---|---|
| JP | 63238783 A | 10/1988 |
| JP | 7203430 A | 8/1995 |
| JP | 2006157881 A | 6/2006 |
| WO | 0111893 | 2/2001 |
| WO | 2004032056 | 4/2004 |

OTHER PUBLICATIONS

International Search Report—PCT/US08/053340—International Search Authority, European Patent Office —Aug. 6, 2008.

International Search Report—PCT/US08/053340—International Search Authority, European Patent Office—Aug. 6, 2008.

Written Opinion—PCT/US08/053340—International Search Authority, European Patent Office—Aug. 6, 2008.

Gray, Robert M., et al., "Quantization," IEEE Transactions on Information Theory, vol. 44, No. 6, Oct. 1, 1998.

Taiwan Search Report—TW097104970—TIPO—Oct. 25, 2011.

He, Zhihai, et al., Domain Source Modeling and Rate Control for Video Coding and Transmission, Department of Electrical and Computer Engineering, University of California, Santa Barbara, CA 93106, 2001.

Shin, Il-Hong, et al., Rate Control Using Linear Rate-p Model for H.264, Signal Processing: Image Communication, 19 (2004) 341-352.

Tasdizen, Ozgur, et al., A High Performance and Low Cost Hardware Architecture for H.264 Transform and Quantization Algorithms, Faculty of Engineering and Natural Sciences, Sabanci University, 34956, Orhanli, Tuzla, Istanbul, Turkey, www.sabanciuniv.edu/, 2005.

* cited by examiner

Histogram Table

| Bin Index | Coefficient Count |
|---|---|
| 0 | $T_0$ |
| 1 | $T_1$ |
| 2 | $T_2$ |
| 3 | $T_3$ |
| ... | ... |
| 51 | $T_{51}$ |
| 52 | $T_{52}$ |

*FIG. 3A*

Distortion Table

| Bin Index | Average Distortion QP = 0 | Average Distortion QP = 1 | Average Distortion QP = 2 | Average Distortion QP = 3 | ... | Average Distortion QP = 51 |
|---|---|---|---|---|---|---|
| 0 | $D_{0,0}$ | $D_{0,0}$ | $D_{0,0}$ | $D_{0,0}$ | ... | $D_{0,0}$ |
| 1 | $D_{1,0}$ | $D_{1,1}$ | $D_{1,1}$ | $D_{1,1}$ | ... | $D_{1,1}$ |
| 2 | $D_{2,0}$ | $D_{2,1}$ | $D_{2,2}$ | $D_{2,2}$ | ... | $D_{2,2}$ |
| 3 | $D_{3,0}$ | $D_{3,1}$ | $D_{3,2}$ | $D_{3,3}$ | ... | $D_{3,3}$ |
| ... | ... | ... | ... | ... | ... | ... |
| 51 | $D_{51,0}$ | $D_{51,1}$ | $D_{51,2}$ | $D_{51,3}$ | ... | $D_{51,51}$ |
| 52 | $D_{52,0}$ | $D_{52,1}$ | $D_{52,2}$ | $D_{52,3}$ | ... | $D_{52,51}$ |

*FIG. 3B*

DISTORTION ESTIMATION FOR QUANTIZED DATA

BACKGROUND

I. Field

The present disclosure relates generally to data processing, and more specifically to techniques for estimating distortion due to quantization of data.

II. Background

Encoding systems are widely used to process data prior to transmission or storage. An encoding system may quantize input data to obtain quantized data and may further process the quantized data to generate output data for transmission or storage. The quantized data may be represented with a set of discrete values, and the step between consecutive discrete values may be a selectable parameter. A large quantization step may result in the quantized data being more coarsely represented, which may result in larger error or more distortion between the input data and the quantized data. However, a large quantization step may allow the quantized data to be represented with fewer bits and/or may result in the quantized data containing more zeros, both of which may allow the output data to be sent at a lower rate and/or stored with less memory. Conversely, a small quantization step may result in the quantized data being more finely represented, which may result in smaller error or less distortion between the input data and the quantized data. However, a small quantization step may also result in the quantized data being represented with more bits and/or containing fewer zeros, both of which may cause the output data to be sent at a higher rate and/or stored with more memory.

There is typically a tradeoff between rate and distortion for quantized data. It may be desirable to efficiently estimate distortion so that an appropriate quantization step may be selected in the rate-distortion tradeoff.

SUMMARY

Techniques for efficiently estimating distortion due to quantization of data are described herein. In an aspect, a histogram with a plurality of bins may be obtained for a set of coefficients to be quantized, which may correspond to a macroblock, a frame, etc. The number of bins for the histogram may be determined based on the number of quantization steps usable for quantizing the set of coefficients. The start and end values for the histogram bins may be determined based on the quantization steps, which may correspond to different quantization parameter (QP) values in H.264, etc.

Distortion due to quantization of the set of coefficients may be estimated based on the histogram and average distortions for the plurality of bins. In one design, the number of coefficients in each bin may be multiplied with an average distortion for that bin to obtain a per-bin distortion. The average distortion for each bin may be indicative of the average energy of errors of quantized coefficients obtained from quantizing the coefficients in the bin. The per-bin distortions for all of the bins may be accumulated to obtain an accumulated distortion. The accumulated distortion may be provided directly as an estimated distortion for the set of coefficients. The accumulated distortion may also be scaled with a correction factor to obtain the estimated distortion, where the correction factor may be determined based on quantization step.

In another aspect, a set of quantization steps is selected for a set of coding elements based on rate-distortion analysis. A coding element may correspond to a macroblock, a frame, etc. Distortions due to quantization of the set of coding elements may be estimated, e.g., for each coding element for each of the quantization steps usable for quantization. Rates to use for the set of coding elements may also be estimated, e.g., for each coding element for each of the usable quantization steps. A set of quantization steps may be selected for the set of coding elements based on the estimated distortions and the estimated rates for the set of coding elements for the usable quantization steps, e.g., such that the total distortion for the set of coding elements is minimized for a given overall rate.

Various aspects and features of the disclosure are described in further detail below.

BRIEF DESCRIPTION OF THE DRAWINGS

FIG. 3A shows a histogram table for a set of coefficients to be quantized.

FIG. 3B shows a distortion table with average distortion versus histogram bin.

DETAILED DESCRIPTION

The distortion estimation techniques described herein may be used for various encoding systems capable of quantizing data. The techniques may also be used for various types of data such as video data, audio data, etc. The techniques may further be used for various encoding standards such as JPEG, MPEG-1, MPEG-2, MPEG-4 (Part 2), H.261, H.263, H.264, etc. For clarity, certain aspects of the techniques are described below for H.264, entitled "Advanced video coding for generic audiovisual services," which is also commonly referred to as MPEG-4 Part 10.

Figure 1:
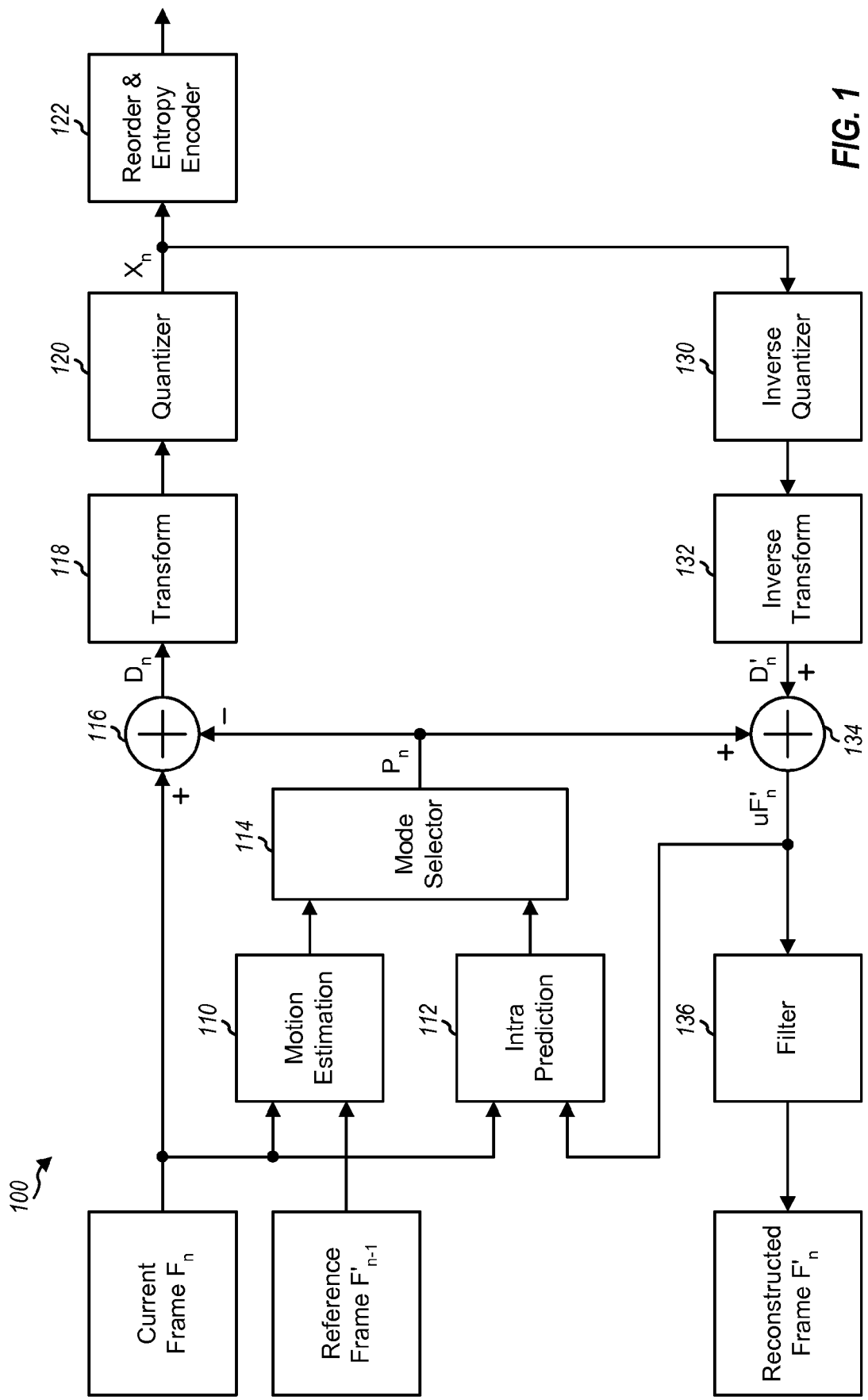
FIG. 1 shows a block diagram of an encoding system.

FIG. 1 shows a block diagram of an encoding system 100 that may be used for H.264 and possibly other standards. Encoding system 100 receives a current frame to be encoded, $F_n$, and generates encoded data for the frame. In general, a frame may have any height and width dimension and may be partitioned into macroblocks. For H.264, each macroblock may contain 16×16 picture elements (pixels) and may be further partitioned into sixteen 4×4 blocks. A macroblock may include 16×16 pixels for luminance (Y), 2×8 pixels for red chrominance (Cr), and 2×8 pixels for blue chrominance (Cb).

Encoding system 100 may process the current frame on a macroblock by macroblock basis. System 100 may also encode each macroblock in either an inter mode or an intra mode. A macroblock in the current frame, or a current macroblock, may be evaluated with both modes, and the mode with better result may be selected. For the inter mode, a motion estimation unit 110 receives the current macroblock, identifies a macroblock in one or more reference frames, $F'_{n-1}$, that closely matches the current macroblock, and provides the identified macroblock as a prediction macroblock for the current macroblock. The reference frame(s) may comprise one or two past or future frames that have been encoded and reconstructed. For the intra mode, an intra prediction unit 112 forms a prediction macroblock for the current macroblock based on samples in the current frame that have been encoded and reconstructed. A mode selector 114 provides the output of either unit 110 or 112, depending on the selected mode, as the prediction macroblock, $P_n$, for the current macroblock.

A summer 116 subtracts the predicted macroblock from the current macroblock and provides a residual or difference macroblock, $D_n$. A transform unit 118 transforms the residual macroblock on a block-by-block basis with an integer transform and provides a transformed macroblock of coefficients. A quantizer 120 quantizes the coefficients in the transformed macroblock and provides a macroblock of quantized coefficients, $X_n$. The quantized coefficients are reordered and entropy encoded by an encoder 122 to obtain encoded data.

In the reconstruction path, an inverse quantizer 130 rescales the quantized coefficients in macroblock $X_n$ in a manner complementary to the quantization by quantizer 120. An inverse transform unit 132 performs inverse transform on the rescaled coefficients on a block-by-block basis and provides a reconstructed difference macroblock, $D'_n$. The quantization by quantizer 120 introduces error or distortion. Consequently, macroblock $D'_n$ is typically not identical to difference macroblock $D_n$ but is instead a distorted version of macroblock $D_n$. A summer 134 sums the prediction macroblock, $P_n$, with the reconstructed difference macroblock, $D'_n$, and provides an unfiltered reconstructed macroblock, $uF'_n$. A filter 136 filters unfiltered reconstructed macroblocks for the current frame to reduce blocking effects and distortion and provides a reconstructed frame, $F'_n$, which may be used to encode other frames.

Encoding system 100 may be used for H.264 and possibly other encoding standards and schemes. The overall encoding process may be similar for many encoding standards and schemes but the details of the various units within the encoding system may be different for different encoding standards and schemes.

In H.264, quantizer 120 may quantize each macroblock of coefficients based on a quantization parameter (QP) value selected for that macroblock. There are 52 possible QP values ranging from 0 to 51. Each QP value is associated with a different divisor, which corresponds to a quantization step for that QP value. There is a one-to-one mapping between QP value and quantization step, and the two terms may be used interchangeably.

A macroblock of coefficients may be quantized in accordance with a particular QP value by dividing each coefficient in the macroblock by the associated divisor. For each coefficient, the quotient or integer portion of the result may be provided as a quantized coefficient, and the remainder or fractional portion of the result may be discarded. The remainder represents error or distortion due to quantization.

The total distortion for a given set of macroblocks may be expressed as:

$$D = \sum_{i=1}^{M} D_i, \qquad \text{Eq (1)}$$

where $D_i$ is the distortion for macroblock i, M is the number of macroblocks in the set of macroblocks, and D is the total distortion for the set of macroblocks. $D_i$ may be computed, e.g., by summing the squares of the remainders for all quantized coefficients in macroblock i.

Figure 2:
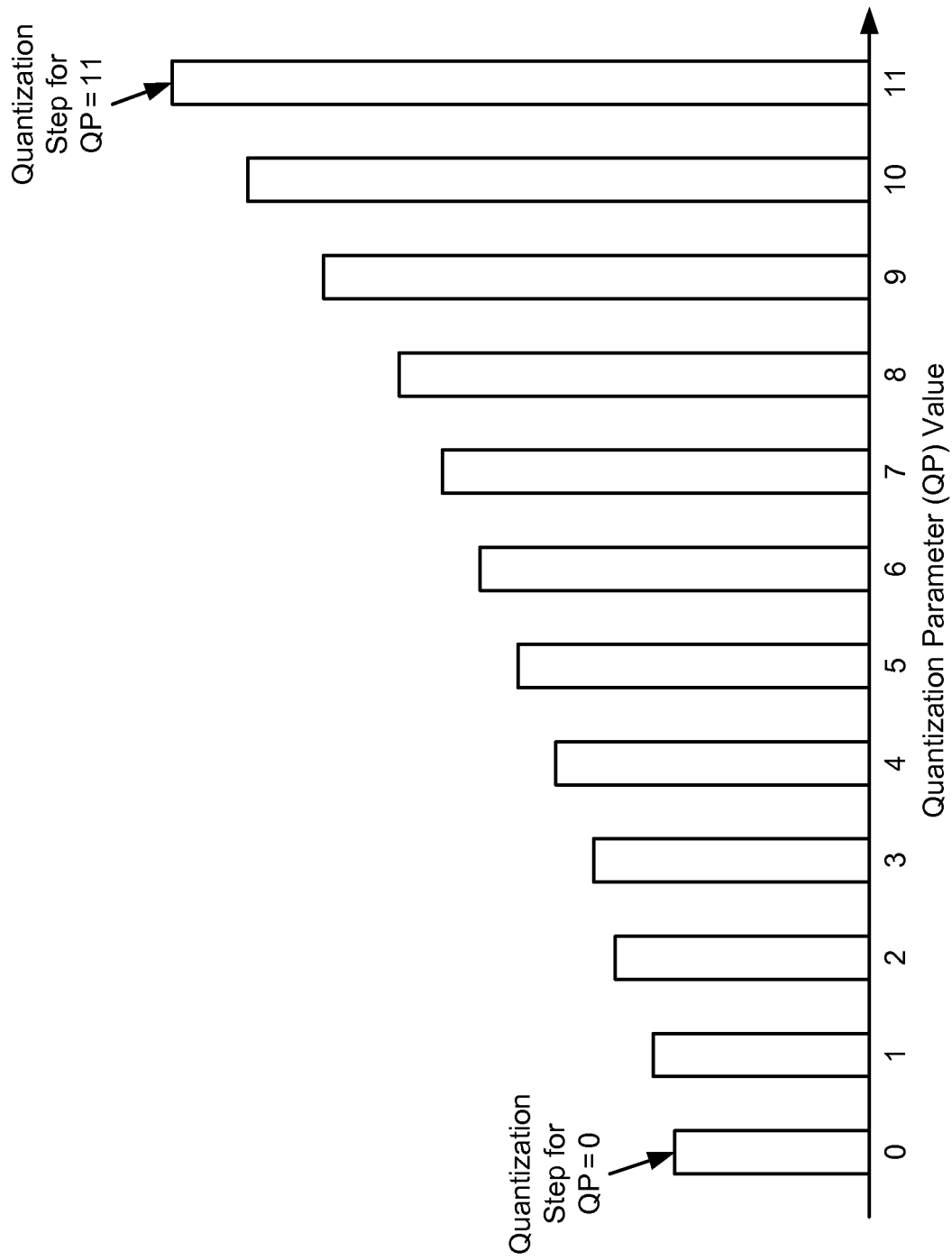
FIG. 2 shows a set of quantization steps for the encoding system.

FIG. 2 shows a plot of quantization steps for QP values of 0 through 11 in H.264. In H.264, the quantization steps are defined such that they increase by approximately 12% for each increment of one in QP value and double for each increment of six in QP value. For each QP value, a coefficient may be quantized to zero if its value is smaller than the quantization step for that QP value. Hence, the average or expected distortion for each QP value is related to the associated quantization step, and distortion is progressively larger for progressively larger QP values.

The total distortion for a macroblock may be reduced by using smaller QP values associated with smaller quantization steps. However, smaller QP values may result in more encoded data, which may require a higher rate for transmission and/or more memory for storage.

The rate for a given set of macroblocks may be expressed as:

$$R = \sum_{i=1}^{M} R_i \le R_b, \qquad \text{Eq (2)}$$

where $R_i$ is the rate for macroblock i, R is the rate for the set of macroblocks, and $R_b$ is a rate budget. The rate budget may be a rate that is allocated for use in a communication system, a target rate for the encoding, etc. The rate for the set of macroblocks should be equal to or less than the rate budget.

It is desirable to minimize the total distortion in equation (1) under the rate constraint in equation (2). This may be equivalent to minimizing the following:

$$\min_{QP_1, QP_2, \ldots, QP_M, \lambda} \sum_{i=1}^{M} D_i(QP_i) + \lambda \cdot \sum_{i=1}^{M} R_i(QP_i), \qquad \text{Eq (3)}$$

where $QP_i$ is a QP value for macroblock i and $\lambda$ is a weighting factor.

In equation (3), a different QP value may be selected for each macroblock in the set of macroblocks, so that $QP_i \in \{0, \ldots, 51\}$. The rate-distortion function in equation (3) selects an appropriate QP value for each macroblock in the set of macroblocks such that the total distortion for the set of macroblocks plus a scaled rate for the set of macroblocks is as small as possible. For rate-distortion analysis, it is desirable to estimate rate as well as distortion for different possible QP values as accurately and efficiently as possible.

Rate may be efficiently estimated based on a $\rho$-domain model, as follows:

$$R_i(QP_q) = A \cdot \rho(QP_q) + B, \qquad \text{Eq (4)}$$

where $\rho(QP_q)$ is the number of non-zero coefficients after quantization with QP value of $QP_q$, A and B are two constants for the p-domain model, and
$R_i(QP_q)$ is the rate for macroblock i with QP value of $QP_q$.

Equation (4) indicates that the rate for macroblock i, when quantized with QP value of $QP_q$ may be estimated by counting the number of non-zero coefficients after quantization. Constants A and B may account for various factors such as the entropy encoder after the quantizer and may be pre-determined for a given encoding system. A table of $\rho(QP_q)$ values versus QP values may be generated in an efficient manner without actually quantizing data with various QP values and counting the number of zeros. The $\rho(QP_q)$ table may then be used to estimate the rates for different QP values based on equation (4).

Equation (4) shows rate-distortion analysis for a set of macroblocks. In general, the rate-distortion analysis may be performed for a set of coding elements that may have any size, e.g., a set of macroblocks, a set of frames, etc. Index i may thus be an index for macroblock, frame, etc.

In an aspect, distortion due to quantization may be efficiently estimated by obtaining a histogram for a set of coefficients to be quantized and applying an average distortion to each bin of the histogram. The set of coefficients may be for a macroblock, multiple macroblocks, a frame, etc. The average distortions for different histogram bins may be pre-calculated and stored in a data structure, e.g., a look-up table. For clarity, a specific design of distortion estimation is described below.

The histogram for the set of coefficients to be quantized may be defined to have L bins, where L may be selected based on the number of quantization steps or QP values. Furthermore, the start and end of each of the L bins may be selected based on the quantization steps. In one design, 53 bins are used for the histogram to cover the 52 QP values in H.264. Table 1 lists the 52 QP values and the quantization step for each QP value. Table 1 also lists the 53 bins of the histogram and the start and end of each bin. In the design shown in Table 1, the start of bin b is equal to one half of the quantization step for QP value of b−1, and the end of bin b is equal to one half of the quantization step for QP value of b. Other low and high values may also be used for each bin.

TABLE 1

| QP Value | Quantization Step | Bin Index | Start of Bin (Low) | End of Bin (High) |
|---|---|---|---|---|
| — | — | 0 | 0 | 0.3125 |
| 0 | 0.625 | 1 | 0.3125 | 0.3438 |
| 1 | 0.6875 | 2 | 0.3438 | 0.4063 |
| 2 | 0.8125 | 3 | 0.4063 | 0.4375 |
| . | . | . | . | . |
| . | . | . | . | . |
| . | . | . | . | . |
| 50 | 208 | 51 | 104 | 112 |
| 51 | 224 | 52 | 112 | — |

The bin parameters in Table 1 may be used when quantization is performed as follows:

$$C_Q = \lfloor (C_{in} + Q_{step}/2)/Q_{step} \rfloor, \quad \text{Eq (5)}$$

where $C_{in}$ is a coefficient to be quantized, $C_Q$ is a quantized coefficient, $Q_{step}$ is a quantization step used for quantization, and "$\lfloor \ \rfloor$" is a floor operator.

The sum of $Q_{step}/2$ in equation (5) achieves rounding (instead of truncation). For example, if $Q_{step}=100$ and the next higher quantization step is 110, then $C_Q$ would be equal to 10 if $950 \leq C_{in} < 1050$, equal to 11 if $1050 \leq C_{in} < 1150$, equal to 12 if $1150 \leq C_{in} < 1250$, etc. The bin corresponding to $Q_{step}$ may be defined by unquantized values that will just become zero if the next higher quantization step of 110 is used. The start and end of the bin may then be equal to 50 and 55, respectively. Hence, when quantization is performed with rounding as shown in equation (5), the start of the bin should be equal to one half of the quantization step for that bin, and the end of the bin should be equal to one half of the next higher quantization step. The start and end of each bin may be defined in other manners for quantization performed in other manners.

The histogram for the set of coefficients to be quantized may be generated based on the bin parameters given in Table 1. In one design, the histogram is generated by binning each coefficient in the set into one of the 53 bins. A coefficient with a value of x may be placed in bin 0 if x is between 0 and 0.3125, placed in bin 1 if x is between 0.3125 and 0.3438, placed in bin 2 if x is between 0.3438 and 0.4063, etc., placed in bin 51 if x is between 104 and 112, and placed in bin 52 if x is greater than 112. Each coefficient in the set may be placed in one of the 53 bins based on its value and the low and high values for each bin of the histogram. After all coefficients in the set have been binned, each bin b (for b=0, . . . , 52) contains a count of the number of coefficients with values between the low and high values of that bin.

In another design, the histogram is generated by determining threshold QP values for the coefficients in the set. A threshold QP value, $QP_t$, for a given coefficient is the largest QP value that results in a non-zero quantized coefficient. For each coefficient in the set, the threshold QP value may be determined for that coefficient, and the bin corresponding to that QP value may be incremented by one. A threshold QP table may be obtained by counting the number of coefficients having QP value of 0 as their threshold QP value, the number of coefficients having QP value of 1 as their threshold QP value, etc. The threshold QP table may be used as the histogram for the set of coefficients. The threshold QP table may be generated for rate estimation and may also be used as the histogram for distortion estimation without incurring any additional processing to obtain the histogram.

FIG. 3A shows a histogram table for the set of coefficients. The number of coefficients in bin 0 is denoted as $T_0$, the number of coefficients in bin 1 is denoted as $T_1$, etc., and the number of coefficient in bin 52 is denoted as $T_{52}$.

For each of the 53 bins of the histogram, an average distortion may be calculated for each of the 52 QP values and stored in a look-up table. The average distortion may also be referred to as the expected distortion, the average error, etc. For a given bin b and QP value of $QP_q$, the average distortion may be calculated with all possible values in bin b being quantized with QP value of $QP_q$. For each possible value in bin b, the quantization of this value with QP value of $QP_q$ results in a quotient that may be provided as a quantized coefficient and a remainder that may be used to calculate the average distortion. The average distortion may be the average energy of the remainders for all possible values in bin b and may be expressed as:

$$D_{b,QP_q} = \frac{1}{K} \cdot \sum_{k=1}^{K} E_{b,QP_q,k}^2, \quad \text{Eq (6)}$$

where $E_{b,QP_q,k}$ is a remainder for the k-th value in bin b after quantization with QP value of $QP_q$, K is the number of values in bin b, and $D_{b,QP_q}$ is an average distortion for bin b with QP value of $QP_q$.

As shown in equation (6), the average distortion may be obtained by computing the square of the remainder for each possible value in bin b, accumulating the squares of the remainders for all possible values in bin b, and dividing the accumulated result by the number of possible values in bin b. The average distortion may also be determined in other manners.

For bin 0, the average distortion may be calculated for all possible values in bin 0 (which are between 0 and 0.3125) with these values quantized with QP value of 0 (or quantization step of 0.625). The average distortion may also be calculated with these values quantized with QP value of 1, then with these values quantized with QP value of 2, etc., and then with these values quantized with QP value of 51. For each remaining bin, the average distortion may be calculated for all possible values in that bin for each of the 52 QP values.

FIG. 3B shows a design of a distortion table with pre-calculated average distortion versus histogram bin for the 52 QP values in H.264. The distortion table includes 53 rows for 53 histogram bins, one row per bin, and 52 columns for the 52 QP values, one column per QP value. The row for bin b (for b=0, ..., 52) contains the average distortion with the values in bin b being quantized with QP values of 0, 1, 2, ..., 51.

For bin 0, the values in this bin range from 0 to 0.3125 and are quantized to zeros with quantization step of 0.625 for QP value of 0. All of the values in bin 0 are also quantized to zeros for larger QP values. The average distortion for bin 0 may be calculated based on the values in bin 0 and denoted as $D_{0,0}$.

For bin 1, the values in this bin range from 0.3125 to 0.3438, are quantized to ones with quantization step of 0.625 for QP value of 0, and are quantized to zeros with quantization step of 0.6875 for QP value of 1. The average distortion for bin 1 when its values are quantized to ones with QP value of 0 may be calculated and denoted as $D_{1,0}$. The average distortion for bin 1 when its values are quantized to zeros with QP value of 1 may be calculated and denoted as $D_{1,1}$. Since the values in bin 1 are also quantized to zeros with QP values greater than 1, $D_{1,1}$ may be used as the average distortion for each of the remaining QP values.

For bin 2, the values in this bin range from 0.3438 to 0.4063, are quantized to twos with quantization step of 0.625 for QP value of 0, quantized to ones with quantization step of 0.6875 for QP value of 1, and quantized to zeros with quantization step of 0.8125 for QP value of 2. The average distortion for bin 2 when its values are quantized to twos with QP value of 0 may be calculated and denoted as $D_{2,0}$. The average distortion for bin 2 when its values are quantized to ones with QP value of 1 may be calculated and denoted as $D_{2,1}$. The average distortion for bin 2 when its values are quantized to zeros with QP value of 2 may be calculated and denoted as $D_{2,2}$. Since the values in bin 2 are also quantized to zeros with QP values greater than 2, $D_{2,2}$ may be used as the average distortion for each of the remaining QP values.

In general, for bin b, the values in this bin are quantized to non-zero values for QP values of 0 to b−1 and to zeros for QP values of b to 51. The average distortion may be calculated for the values in bin b for each of QP values of 0 to b. The average distortion for QP value of b may also be used for QP values of b+1 to 51. The average distortion for the values in bin b when quantized with QP value of $QP_q$ is denoted as $D_{b,QP_q}$, for b=0, ..., 52 and $QP_q$=0, ..., 51. If the quantization step increases beyond the values in bin b, then the distortion is limited by the energy of the values in bin b. Hence, $D_{b,QP_q}=D_{b,b}$ for $QP_q>b$.

For the bin parameters given in Table 1, a total of 1430 average distortions may be calculated for bins 0 to 52 and for QP values of 0 to b for each bin b. These 1430 average distortions may be stored in the distortion table shown in FIG. 3B. The remaining 1326 entries in the distortion table for QP values greater than bin indices (or $QP_q>b$) may be repeated values.

The distortion for the set of coefficients may be estimated for each possible QP value based on the histogram and the distortion table. The estimated distortion for each QP value may be expressed as:

$$D(QP_q) = E(QP_q) \cdot \sum_{b=0}^{52} T_b \cdot D_{b,QP_q}, \qquad \text{Eq (7)}$$

where $T_b$ is the number of coefficients in bin b,
$E(QP_q)$ is a correction factor for QP value of $QP_q$, and
$D(QP_q)$ is the estimated distortion (or distortion estimate) for the set of coefficients when quantized with QP value of $QP_q$.

In equation (7), the estimated distortion is obtained by (a) multiplying the number of coefficients in each bin, $T_b$, with the average distortion for that bin, $D_{b,QP_q}$, to obtain a per-bin distortion, (b) summing the per-bin distortions for all 53 bins, and (c) applying the correction factor $E(QP_q)$. The correction factor may account for systematic error or bias in the estimated distortions for different QP values, as described below.

The estimated distortion may be determined for each of the 52 possible QP values based on equation (7). The estimated distortions $D(QP_0)$ through $D(QP_{51})$ for all 52 QP values may be used for various purposes such as rate-distortion analysis.

Figure 4A:
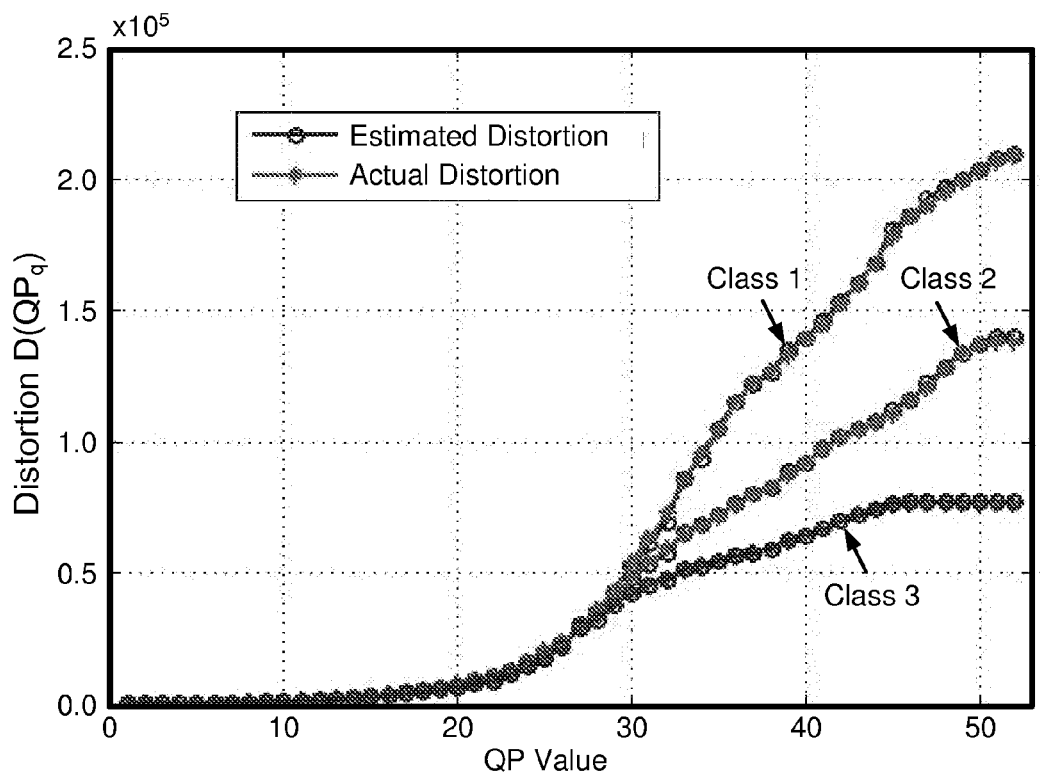
FIGS. 4A and 4B show estimated distortions for three classes of macroblocks.

FIG. 4A shows actual and estimated distortions for three classes of macroblocks. Each class includes a number of macroblocks that are selected based on SAD, which is the sum of absolute difference between a current macroblock and a predicted macroblock. A SAD value may be computed for each macroblock during motion estimation. A large SAD value is indicative of larger error between a macroblock and its predicted macroblock, which may result in more non-zero coefficients. The three classes include macroblocks in three different ranges of SAD values. Each macroblock is quantized with each of the 52 QP values. For each QP value, the actual distortion is computed and the estimated distortion is also computed as shown in equation (7). The actual distortions for all macroblocks in each class are averaged for each QP value and plotted in FIG. 4A. Similarly, the estimated distortions for all macroblocks in each class are averaged for each QP value and plotted in FIG. 4A. The plots in FIG. 4A suggest that the estimated distortion closely matches the actual distortion for all three classes and across all QP values.

Figure 4B:
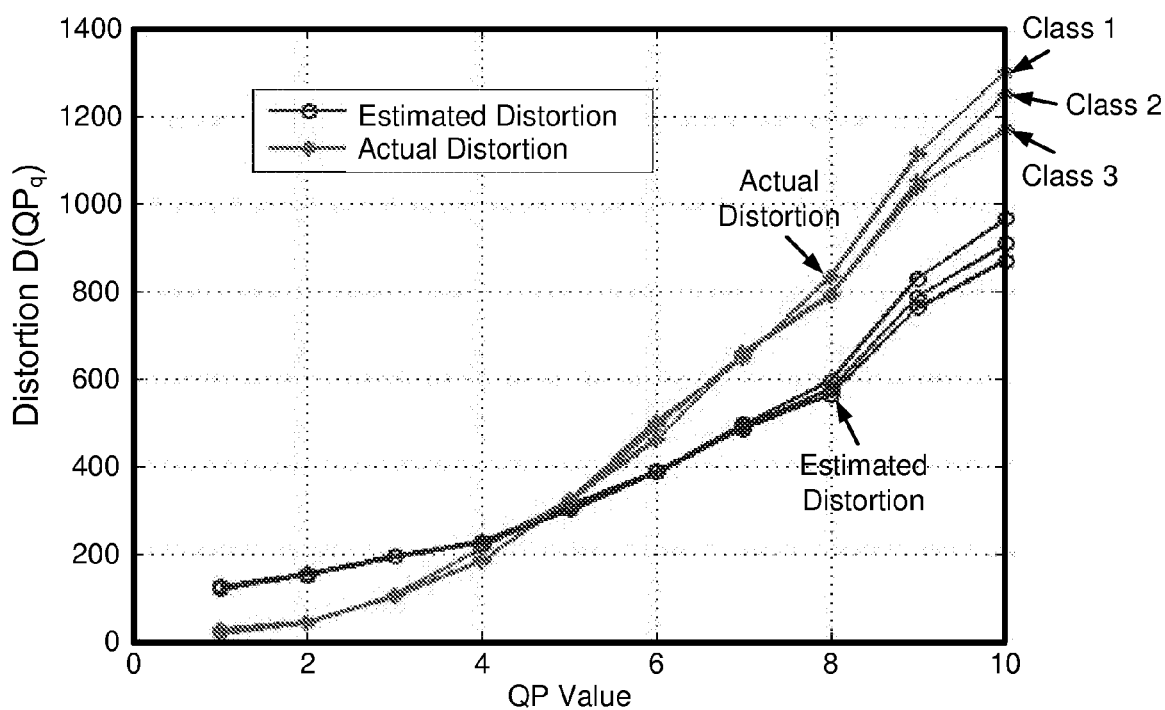

FIG. 4B shows the actual and estimated distortions for the three classes of macroblocks for low QP values of 1 through 10. FIG. 4B is a close-up or zoom-in of the lower left corner of FIG. 4A. FIG. 4B indicates that the plots for estimated distortions deviate from the plots for actual distortions for low QP values. The estimated distortions for low QP values have larger errors (percentage wise) than the estimated distortions for high QP values.

For low QP values, a small quantization step assumption that the coefficient values are large relative to the quantization step is generally valid. Hence, the distortion is more a function of quantization step and not as much a function of data distribution. For large QP values, the small quantization step assumption does not hold well. Hence, the distortion is a function of the data distribution as well as the quantization step.

In equation (7), the correction factor $E(QP_q)$ may be used to account for systematic error or bias between the actual distortions and the estimated distortions for low QP values. The systematic error may be due to changes in quantization divisor introduced to reduce fixed-point implementation error of the inverse quantization. The correction factor may be estimated based on data, computed empirically, determined via computer simulation, etc. For example, the actual distortions may be determined for different QP values based on actual data or test data, the estimated distortions may also be determined for different QP values based on the same data, and the correction factor may be determined for different QP values based on the actual and estimated distortions for these QP values.

Figure 5:
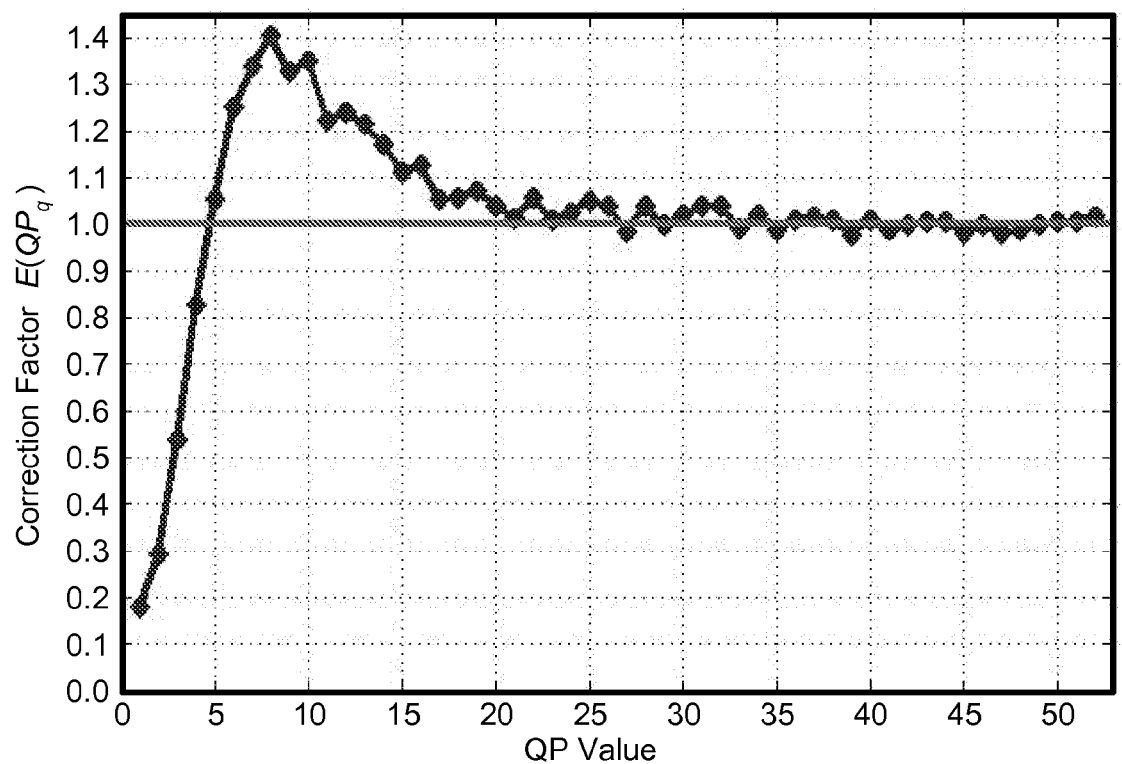
FIG. 5 shows a plot of correction factor versus QP values.

FIG. 5 shows an example plot of the correction factor $E(QP_q)$ for different QP values. The plot is obtained by computing the actual and estimated distortions for different QP values based on data and computing the percentage difference between the actual and estimated distortions for each QP value. As shown in FIGS. 4B and 5, distortion is over-estimated for QP values less than 5 and is under-estimated for QP values between 5 and 20. The error in the estimated distortion is less than 10% for QP values greater than 15 and less than 5% for QP values greater than 20.

The error of the estimated distortion may be relatively high (percentage wise) for low QP values. However, the error is less dependent on data and more dependent on QP value. Hence, the error may be corrected relatively easily and accurately by applying the correction factor.

In general, the correction factor may be defined as follows:
$E(QP_q)=1.0$ implies no systematic error in the estimated distortion,
$E(QP_q)>1.0$ implies systematic under-estimation of the distortion, and
$E(QP_q)<1.0$ implies systematic over-estimation of the distortion.

Figure 6:
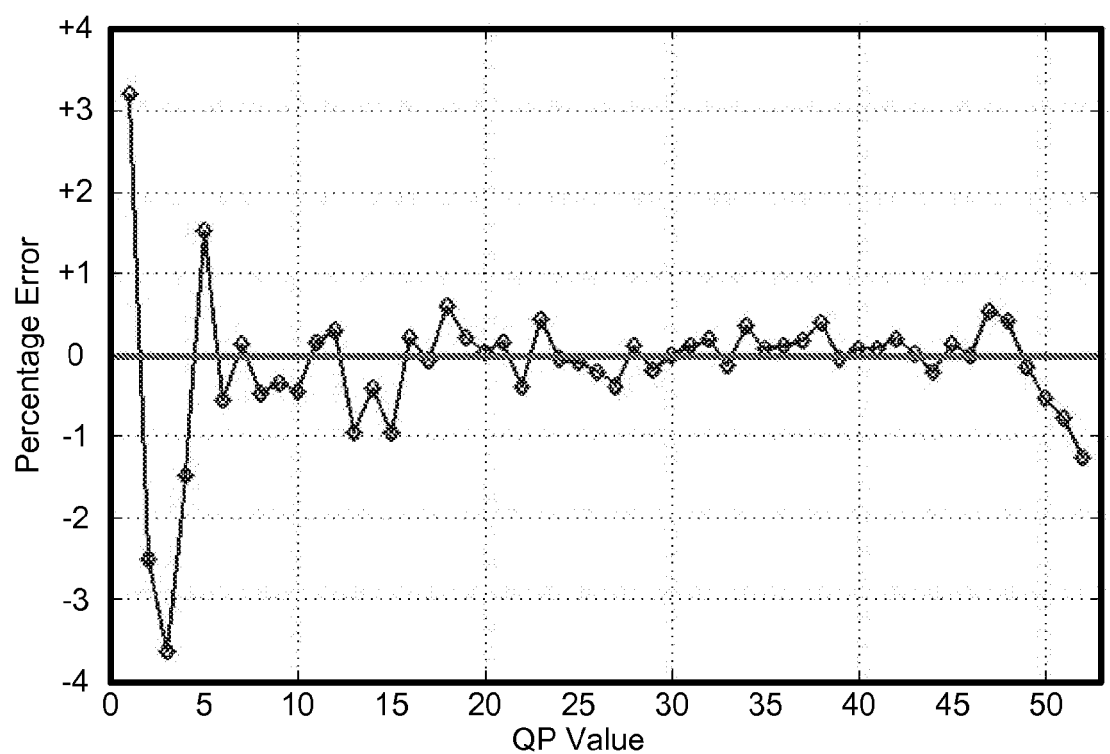
FIG. 6 shows a plot of percentage error for estimated distortion versus QP values after applying the correction factor.

FIG. 6 shows an example plot of percentage error between the estimated and actual distortions for different QP values with use of the correction factor shown in FIG. 5. As shown in FIG. 6, after application of the correction factor on an independent set of data, the error in the estimated distortion may be substantially reduced. In this example, the maximum error is less than 4% and the average error is approximately 0.5%. The techniques described herein may thus be able to provide relatively accurate estimate of distortion due to quantization.

The techniques described herein may be used for encoding systems capable of quantizing data with multiple quantization steps, e.g., H.264. The techniques may also be used for encoding systems that quantize data with a single fixed quantization step.

The techniques may also be used for various purposes. In one design, techniques may be used for constant rate bit allocation. Distortions may be estimated for a set of coding elements for different QP values. Rates may also be estimated for the set of coding elements for different QP values. For example, distortion and rate may be estimated for each coding element for each of the 52 QP values. The estimated distortions and the estimated rates for the set of coding elements for different QP values may be used for rate-distortion analysis to select a set of QP values for the set of coding elements, one QP value for each coding element, that results in the smallest total distortion for the set of coding elements for a given overall rate.

In another design, the techniques may be used for constant peak signal-to-noise ratio (PSNR) bit allocation. PSNRs of a set of coding elements may be predicted for different QP values based on the estimated distortions for the set of coding elements for these QP values. For example, the PSNR of each coding element may be predicted for each of the 52 QP values based on the estimated distortion for that coding element for that QP value. A set of QP values may then be selected to achieve a constant PSNR across all of the coding elements in the set, e.g., across an entire frame, clip, etc. Variable rate may be used to achieve a particular constant PSNR. Alternatively, the highest possible constant PSNR may be achieved for a given overall rate for the set of coding elements.

In yet another design, the techniques may be used for constant perceptual quality bit allocation. Perceptual distortion or quality may be estimated in various manners. In one design, which is referred to as perceptual weighting, different coefficients in a coding element may be given different weights prior to combining the contributions of these coefficients to obtain the estimated distortion of the coding element. For example, coefficients that represent frequency components that are less important may be given less weight. In another design, the overall texture and lighting characteristics of a coding element may be used to estimate the perceived distortion. For example, small distortion in a coding element with very low frequency components (flat) may be perceived as high distortion. Variance may be used as a measure of high frequency components in the coding element. The distortion of the coding element may be weighted with (Var_t/Var_i) to obtain the perceptual distortion, where Var_t is the total variance of the set of coding elements and Var_i is the variance of the coding element. Perceptual quality metric values may be obtained for each coding element for different QP values based on weights or factors affecting perceived quality (such as spatial activity and temporal activity). These metric values may be used to select a set of QP values for the set of coding elements that can result in constant perceptual quality. Variable rate may be used to achieve a particular constant perceptual quality. Alternatively, the best possible perceptual quality may be achieved for a given overall rate for the set of coding elements. The estimated distortions may also be used in other manners and/or for other purposes.

Figure 7:
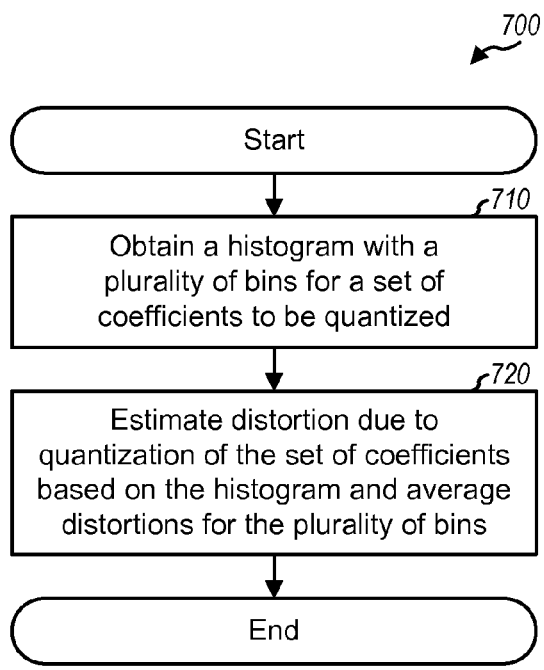
FIG. 7 shows a process for estimating distortion due to quantization.

FIG. 7 shows a process 700 for estimating distortion due to quantization. A histogram with a plurality of bins may be obtained for a set of coefficients to be quantized (block 710). The set of coefficients may correspond to a macroblock, a frame, etc. The number of bins for the histogram may be determined based on the number of quantization steps usable for quantizing the set of coefficients. The start and end values for the histogram bins may be determined based on the quantization steps. The histogram may be obtained by mapping each coefficient in the set to one of the bins based on the value of the coefficient and the start and end values of each bin. The histogram may also be obtained by determining, for each coefficient, a threshold QP value corresponding to the largest quantization step that results in a non-zero quantized coefficient. The histogram may then be obtained based on the threshold QP values for all of the coefficients in the set.

Distortion due to quantization of the set of coefficients may be estimated based on the histogram and average distortions for the plurality of bins (block 720). For block 720, the number of coefficients in each bin may be multiplied with an average distortion for the bin to obtain a per-bin distortion. The per-bin distortions for all of the bins may be accumulated to obtain an accumulated distortion. The accumulated distortion may be provided directly as an estimated distortion for the set of coefficients. The accumulated distortion may also be scaled with a correction factor to obtain the estimated distortion, where the correction factor may be determined based on the quantization step.

Distortion due to quantization may be estimated for each of a plurality of quantization steps based on the histogram and the average distortions for the plurality of bins for each quantization step. The distortion for each quantization step may further be estimated based on the correction factor, which may be a function of quantization step. The plurality of quantization steps may correspond to the 52 QP values in H.264 or some other set of quantization steps for some other encoding system or standard.

Figure 8:
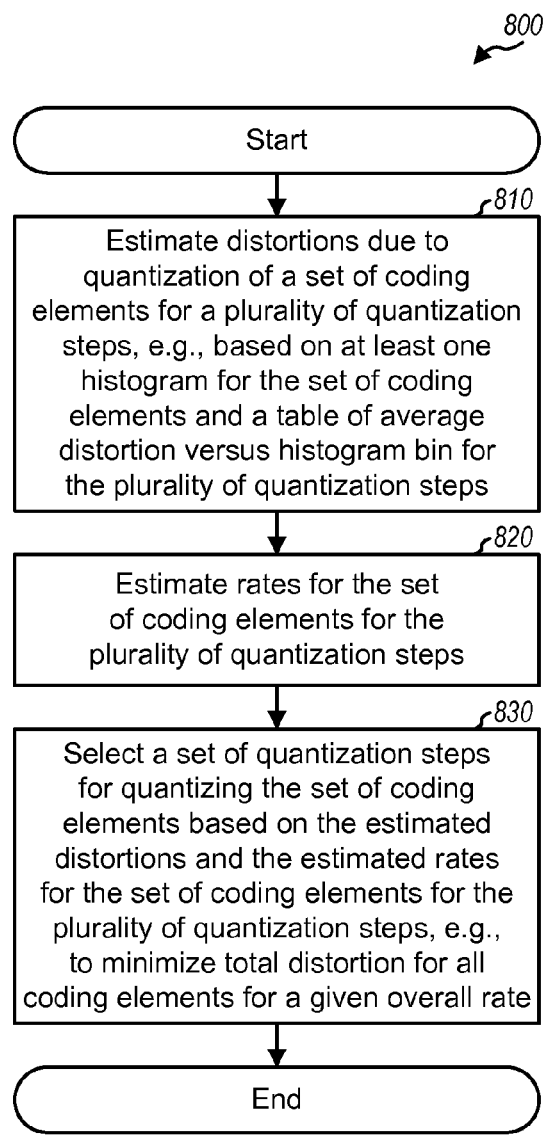
FIG. 8 shows a process for selecting a quantization step.

FIG. 8 shows a process 800 for selecting quantization steps. Distortions due to quantization of a set of coding elements may be estimated for a plurality of quantization steps, e.g., based on at least one histogram for the set of coding elements and a table of average distortion versus histogram bin for the plurality of quantization steps (block 810). A histogram may be obtained for one or multiple coding elements. For example, a histogram may be obtained for each coding element, and distortion may be estimated for each coding element for each quantization step based on its histogram. Rates for the set of coding elements may also be estimated for the plurality of quantization steps, e.g., based on a $\rho(QP_q)$ table described above (block 820). For example, a rate may be estimated for each coding element for each quantization step. A set of quantization steps may be selected for quantizing the set of coding elements based on the estimated distortions and the estimated rates for the set of coding elements for the plurality of quantization steps (block 830). For example, one quantization step may be selected for each coding element such that the total distortion (or the sum of the estimated distortions of the individual coding elements in the set) is minimum for a given overall rate. The set of quantization steps may also be selected based on other criterion such as constant PSNR, constant perceptual quality, etc.

The techniques described herein may be used for communication, computing, networking, personal electronics, etc. For example, the techniques may be used for wireless communication devices, handheld devices, gaming devices, computing devices, consumer electronics devices, computers, etc. An example use of the techniques for a wireless communication device is described below.

Figure 9:
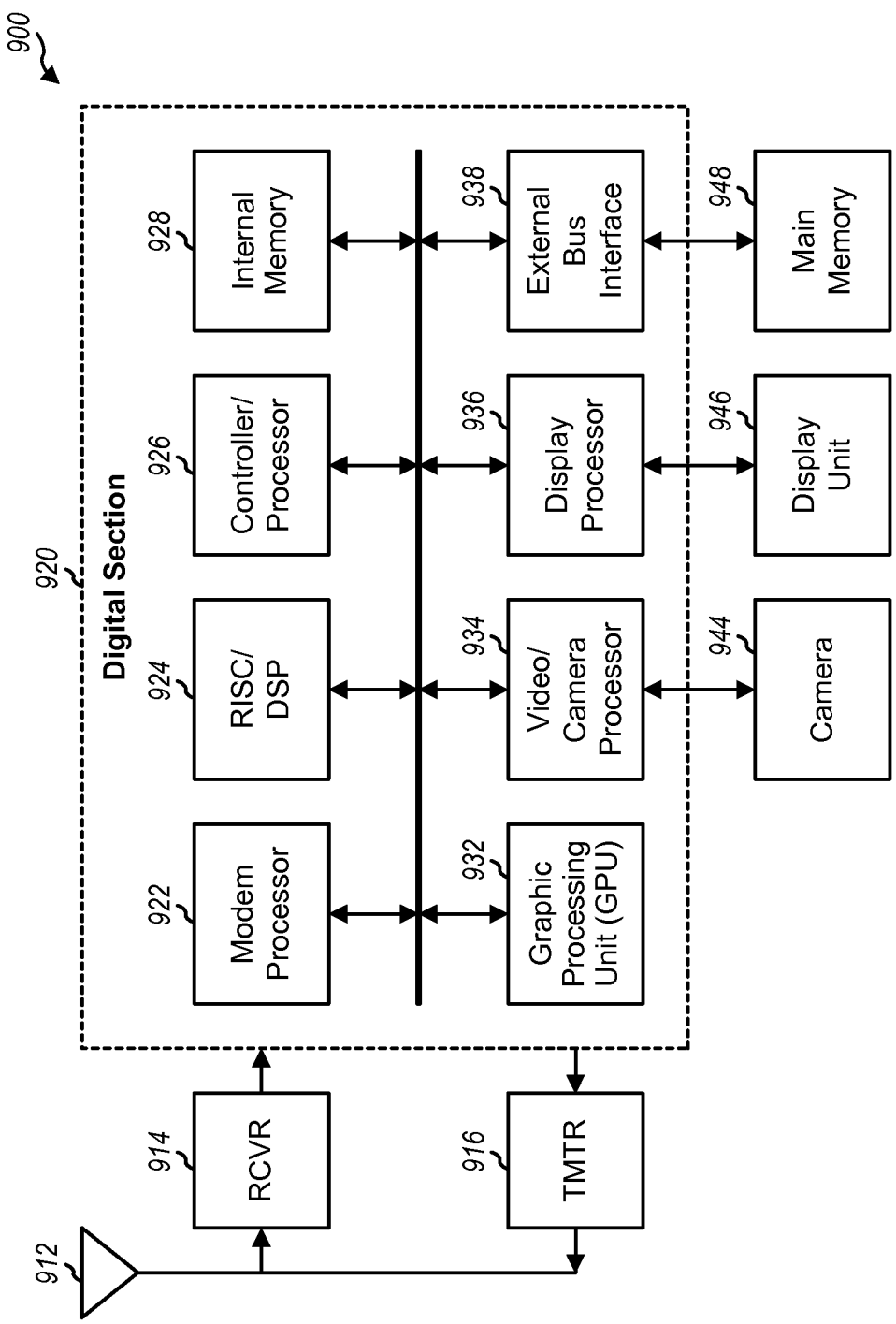
FIG. 9 shows a block diagram of a wireless communication device.

FIG. 9 shows a block diagram of a design of a wireless communication device 900 in a wireless communication system. Wireless device 900 may be a cellular phone, a terminal, a handset, a personal digital assistant (PDA), a wireless modem, etc. The wireless communication system may be a Code Division Multiple Access (CDMA) system, a Global System for Mobile Communications (GSM) system, etc.

Wireless device 900 is capable of providing bi-directional communication via a receive path and a transmit path. On the receive path, signals transmitted by base stations are received by an antenna 912 and provided to a receiver (RCVR) 914. Receiver 914 conditions and digitizes the received signal and provides samples to a digital section 920 for further processing. On the transmit path, a transmitter (TMTR) 916 receives data to be transmitted from digital section 920, processes and conditions the data, and generates a modulated signal, which is transmitted via antenna 912 to the base stations.

Digital section 920 includes various processing, interface and memory units such as, for example, a modem processor 922, a reduced instruction set computer/digital signal processor (RISC/DSP) 924, a controller/processor 926, an internal memory 928, a graphics processing unit (GPU) 932, a video/camera processor 934, a display processor 936, and an external bus interface (EBI) 938. Modem processor 922 may perform processing for data transmission and reception, e.g., encoding, modulation, demodulation, and decoding. RISC/DSP 924 may perform general and specialized processing for wireless device 900. Controller/processor 926 may direct the operation of various processing and interface units within digital section 920. Internal memory 928 may store data and/or instructions for various units within digital section 920.

GPU 932 may perform graphics processing for 2-dimensional and/or 3-dimensional graphics. Video/camera processor 934 may receive data for images from a camera 944 and may perform processing on data for still images, moving videos, moving texts, etc., for camera and video applications such as camcorder, video playback, video conferencing, etc. Display processor 936 may perform processing to facilitate the display of videos, graphics, images, and texts on a display unit 946. EBI 938 may facilitate transfer of data between digital section 920 and a main memory 948. The techniques described herein may be implemented by GPU 932 on graphics images, video/camera processor 934 on captured images, display processor 936 for output images, etc.

Digital section 920 may be implemented with one or more processors, DSPs, micro-processors, RISCs, etc. Digital section 920 may also be fabricated on one or more application specific integrated circuits (ASICs) and/or some other type of integrated circuits (ICs).

The distortion estimation techniques described herein may be implemented by various means. For example, these techniques may be implemented in hardware, firmware, software, or a combination thereof. For a hardware implementation, the processing units for the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the distortion estimation techniques may be implemented with modules (e.g., procedures, functions, etc.) that perform the functions described herein. The firmware and/or software codes may be stored in a memory (e.g., memory 928 and/or 948 in FIG. 9) and executed by a processor (e.g., processor 924, 926, 932, 934 and/or 936). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a memory; and
a processor coupled to the memory, the processor configured to:
obtain a histogram using a plurality of bins for a set of coefficients to be quantized, the histogram including a mapping of each coefficient in the set to one of the plurality of bins, each of the plurality of bins corresponding to a quantization step within a set of quantization steps;
determine a distortion scaling factor based on the quantization step used for quantizing the set of coefficients;
estimate distortion due to quantization of the set of coefficients based on a number of coefficients in each bin of the histogram, average distortions for bins of the plurality of bins, and the distortion scaling factor; and
estimate perceptual quality for the set of coefficients for the plurality of bins based on the estimated distortions and at least one of spatial activity for the coefficients and temporal activity for the coefficients.

2. The apparatus of claim 1, wherein the processor is configured to multiply the number of coefficients in each bin of the histogram with an average distortion for the bin to obtain a per-bin distortion, to accumulate per-bin distortions for the plurality of bins to obtain an accumulated distortion, and to derive an estimated distortion for the set of coefficients based on the accumulated distortion scaled based on the distortion scaling factor.

3. The apparatus of claim 1, wherein for each of a plurality of quantization steps the processor is configured to estimate distortion due to quantization of the set of coefficients with the quantization step based on the histogram and average distortions for the plurality of bins for the quantization step.

4. The apparatus of claim 3, wherein the processor is configured to estimate distortion for each of the plurality of quantization steps based on a correction factor that is a function of quantization step.

5. The apparatus of claim 3, wherein the plurality of quantization steps correspond to a plurality of quantization parameter (QP) values in H.264.

6. The apparatus of claim 1, wherein the number of bins for the histogram is determined based on the number of quantization steps usable for quantizing the set of coefficients.

7. The apparatus of claim 1, wherein start and end values for the plurality of bins are determined based on a plurality of quantization steps usable for quantizing the set of coefficients.

8. The apparatus of claim 1, wherein to obtain the histogram the processor is configured to map each coefficient in the set to one of the plurality of bins based on a value of the coefficient and start and end values of each bin.

9. The apparatus of claim 1, wherein the processor is configured to determine, for each coefficient in the set, a threshold quantization parameter (QP) value corresponding to a largest quantization step that results in a non-zero quantized coefficient, and to obtain the histogram based on threshold QP values for the coefficients in the set.

10. The apparatus of claim 1, wherein the memory is configured to store a table of average distortion versus bin for a plurality of quantization steps usable for quantizing the set of coefficients.

11. The apparatus of claim 1, wherein an average distortion for each bin of the histogram for a particular quantization step is indicative of average energy of errors of quantized coefficients obtained from quantizing coefficients in the bin with the particular quantization step.

12. The apparatus of claim 1, wherein the set of coefficients corresponds to a macroblock or a frame of coefficients.

13. A method of distortion estimation of a quantized signal comprising:
obtaining, in an electronic device, a histogram using a plurality of bins for a set of coefficients to be quantized, the histogram including a mapping of each coefficient in the set to one of the plurality of bins, each of the plurality of bins corresponding to a quantization step within a set of quantization steps;
determining, in the electronic device, a distortion scaling factor based on the quantization step used for quantizing the set of coefficients;
estimating, in the electronic device, distortion due to quantization of the set of coefficients based on a number of coefficients in each bin of the histogram, average distortions for bins of the plurality of bins, and the distortion scaling factor; and
estimating perceptual quality for the set of coefficients for the plurality of bins based on the estimated distortions and at least one of spatial activity for the coefficients and temporal activity for the coefficients.

14. The method of claim 13, wherein the estimating distortion due to quantization comprises:
multiplying the number of coefficients in each bin of the histogram with an average distortion for the bin to obtain a per-bin distortion,
accumulating per-bin distortions for the plurality of bins to obtain an accumulated distortion, and
deriving an estimated distortion for the set of coefficients based on the accumulated distortion scaled based on the distortion scaling factor.

15. An apparatus comprising:
means for obtaining a histogram using a plurality of bins for a set of coefficients to be quantized, the histogram including a mapping of each coefficient in the set to one of the plurality of bins, each of the plurality of bins corresponding to a quantization step within a set of quantization steps; and
means for estimating configured to:
determine a distortion scaling factor based on the quantization step used for quantizing the set of coefficients;
estimate distortion due to quantization of the set of coefficients based on a number of coefficients in each bin of the histogram, average distortions for bins of the plurality of bins, and the distortion scaling factor; and
estimate perceptual quality for the set of coefficients for the plurality of bins based on the estimated distortions and at least one of spatial activity for the coefficients and temporal activity for the coefficients.

16. The apparatus of claim 15, wherein the means for estimating comprises:
means for multiplying the number of coefficients in each bin of the histogram with an average distortion for the bin to obtain a per-bin distortion,
means for accumulating per-bin distortions for the plurality of bins to obtain an accumulated distortion,
means for deriving an estimated distortion for the set of coefficients based on the accumulated distortion; and
means for scaling the accumulated distortion based on the distortion scaling factor.

17. A non-transitory computer-readable medium comprising instructions that, when executed by a processor of an apparatus, cause the apparatus to:
obtain a histogram using a plurality of bins for a set of coefficients to be quantized, the histogram including a mapping of each coefficient in the set to one of the plurality of bins, each of the plurality of bins corresponding to a quantization step within a set of quantization steps;
determine a distortion scaling factor based on the quantization step used for quantizing the set of coefficients;
estimate distortion due to quantization of the set of coefficients based on a number of coefficients in each bin of the histogram, average distortions for bins of the plurality of bins, and the distortion scaling factor; and
estimate perceptual quality for the set of coefficients for the plurality of bins based on the estimated distortions and at least one of spatial activity for the coefficients and temporal activity for the coefficients.

18. The non-transitory computer-readable medium of claim 17, and further comprising instructions that, when executed by a processor of the apparatus, cause the apparatus to:
- multiply the number of coefficients in each bin of the histogram with an average distortion for the bin to obtain a per-bin distortion,
- accumulate per-bin distortions for the plurality of bins to obtain an accumulated distortion, and
- derive an estimated distortion for the set of coefficients based on the accumulated distortion and the distortion scaling factor.

19. An apparatus comprising:
- a memory; and
- a processor coupled to the memory, the processor configured to:
  - determine a distortion scaling factor for each of a plurality of quantization steps, each distortion scaling factor based on a corresponding quantization step used for quantizing a set of coding elements;
  - estimate distortions due to quantization of the set of coding elements for the plurality of quantization steps based on at least one histogram for the set of coding elements, and a table of average distortions versus histogram bins, and the distortion scaling factors associated with the quantization steps;
  - estimate rates for the set of coding elements for the plurality of quantization steps;
  - estimate perceptual quality for the set of coding elements for the plurality of quantization steps based on the estimated distortions and at least one of spatial activity for the coding elements and temporal activity for the coding elements; and
  - select a set of quantization steps for quantizing the set of coding elements based on the estimated distortions and the estimated rates for the set of coding elements for the plurality of quantization steps, the selecting including selecting the set of quantization steps for the set of coding elements, one quantization step for each coding element, to achieve approximately constant perceptual quality for the set of coding elements.

20. The apparatus of claim 19, wherein the processor is configured to obtain a histogram for each coding element in the set of coding elements, and to estimate distortions and rates for each coding element for each of the plurality of quantization steps based on the histogram for the coding element.

21. The apparatus of claim 19, wherein the processor is configured to estimate the rates for the plurality of quantization steps based on a table with a number of non-zero quantized coefficients for each of the plurality of quantization steps.

22. The apparatus of claim 19, wherein the processor is configured to select the set of quantization steps for the set of coding elements, one quantization step for each coding element, to achieve lowest total distortion for the set of coding elements for a particular overall rate.

23. The apparatus of claim 19, wherein the processor is configured to estimate signal-to-noise ratios (SNRs) of the set of coding elements for the plurality of quantization steps based on the estimated distortions, and to select the set of quantization steps for the set of coding elements, one quantization step for each coding element, to achieve approximately constant SNRs for the set of coding elements.

24. A method of distortion estimation of a quantized signal comprising:
- determining, in an electronic device, a distortion scaling factor for each of a plurality of quantization steps, each distortion scaling factor based on a corresponding quantization step used for quantizing a set of coding elements;
- estimating, in the electronic device, distortions due to quantization of the set of coding elements for the plurality of quantization steps based on at least one histogram for the set of coding elements, a table of average distortions versus histogram bins, and the distortion scaling factors associated with the quantization steps;
- estimating rates for the set of coding elements for the plurality of quantization steps;
- estimating perceptual quality for the set of coding elements for the plurality of quantization steps based on the estimated distortions and at least one of spatial activity for the coding elements and temporal activity for the coding elements; and
- selecting a set of quantization steps for quantizing the set of coding elements based on the estimated distortions and the estimated rates for the set of coding elements for the plurality of quantization steps, the selecting including selecting the set of quantization steps for the set of coding elements, one quantization step for each coding element, to achieve approximately constant perceptual quality for the set of coding elements.

25. The method of claim 24, wherein the selecting the set of quantization steps comprises selecting the set of quantization steps for the set of coding elements, one quantization step for each coding element, to achieve lowest total distortion for the set of coding elements for a particular overall rate.

* * * * *